United States Patent [19]
Nowicki

[11] 3,762,213
[45] Oct. 2, 1973

[54] LEAK DETECTOR
[75] Inventor: Casimir W. Nowicki, Toledo, Ohio
[73] Assignee: Owens-Illinois, Inc., Toledo, Ohio
[22] Filed: May 3, 1971
[21] Appl. No.: 139,896

Related U.S. Application Data
[63] Continuation of Ser. No. 840,181, July 9, 1969, abandoned.

[52] U.S. Cl. .................................. 73/45.3, 73/49.2
[51] Int. Cl. ............................................ G01m 3/34
[58] Field of Search .................. 73/45.3, 49.2–49.4, 73/45–45.2, 37; 92/5; 60/54

[56] References Cited
UNITED STATES PATENTS
| 3,043,129 | 7/1962  | King ........................................ 73/46 |
| 2,177,019 | 10/1939 | Egenolf .................................... 73/45.3 |
| 3,374,887 | 3/1968  | Paruolo et al. ........................... 73/37 X |
| 2,309,231 | 1/1943  | Bagley ..................................... 73/45.3 |
| 2,548,645 | 4/1951  | Ashcroft et al. ......................... 73/45.3 |
| 2,880,610 | 4/1959  | McCoy ..................................... 73/49.2 |

FOREIGN PATENTS OR APPLICATIONS
117,156  6/1956  U.S.S.R. ............................ 73/45.3

Primary Examiner—Richard C. Queisser
Assistant Examiner—Daniel M. Yasich
Attorney—Philip M. Rice

[57] ABSTRACT

A method and apparatus is provided for detecting leaks in plastic bottles. The leak detector is sealingly engaged to the mouth of the bottle to be tested. Thereafter, a vacuum is drawn in the bottle by moving a rod having a flexible diaphragm connected thereto away from the bottle mouth. Such movement of the diaphragm while the detector is engaged to the bottle mouth results in an increased volume within the sealed area with no change in the amount of air contained within such sealed area. Accordingly, the pressure within such sealed area will be reduced from atmospheric pressure thereby creating a partial vacuum. Means are provided for lifting the head with the partially vacuumized bottle carried thereon. If the bottle is satisfactory from a leakage standpoint, it will be retained thereon by virtue of the vacuum for a predetermined period of time, say on the order of three seconds. On the other hand, if the bottle contains a leak, sufficiently great to render the bottle commercially unsatisfactory, the partial vacuum will be lost and the bottle will fall from the head, thereby indicating that the bottle was defective.

4 Claims, 5 Drawing Figures

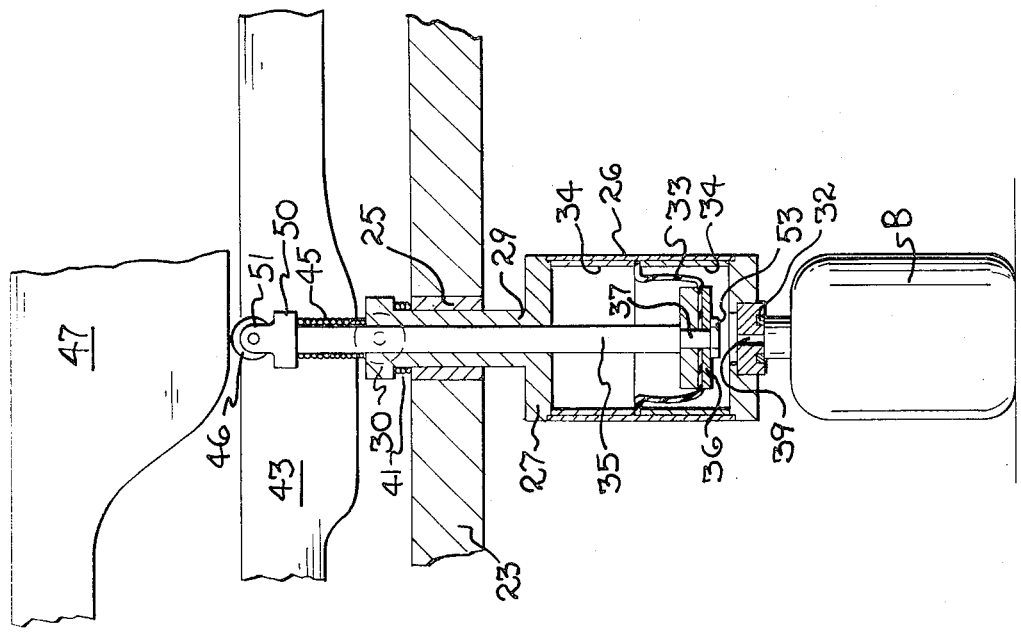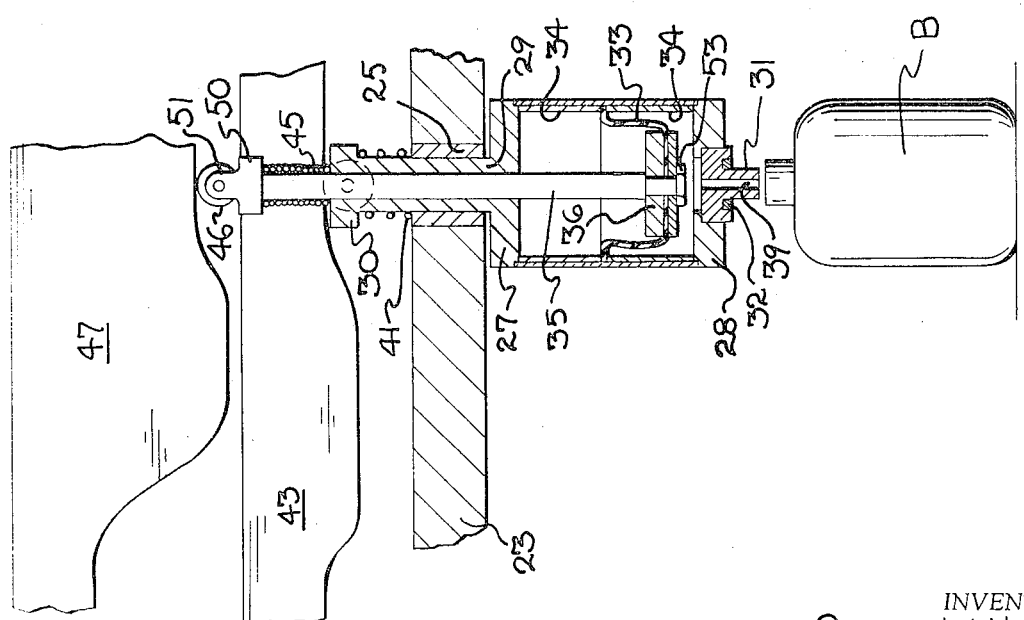

INVENTOR.
CASIMIR W. NOWICKI
ATTORNEYS

LEAK DETECTOR

This application is a continuation of Ser. No. 840,181, filed July 9, 1969, now abandoned.

BACKGROUND OF THE INVENTION

In the forming of plastic bottles, problems are frequently encountered by the presence of minute pinholes in the bottles. Although not readily discernible to the eye, the presence of such pinholes is reason for rejecting the bottle.

Accordingly, it is necessary that plastic bottles be tested to determine whether they have pinholes which would present problems if the bottle were used for packaging goods. The bottles are customarily tested by introducing therein fluid pressure from an outside source and waiting for a period of time to see whether such pressure is lost through pin holes contained in the bottle. The prior art devices have been fairly expensive and have generally required a source of compressed air or similar medium for introducing pressure into the bottle to be tested. Such prior art devices have been cumbersome to operate and have required excessive amounts of time to test individual bottles. Other prior art devices rely on measuring mechanical vibrations produced when a bottle subjected to fluid pressure leaks. One such device is described in U. S. Pat. No. 3,224,252.

It is an object of the present invention to provide a new and economical device for leak testing plastic bottles.

It is another object of the present invention to provide a leak detector which is completely self-contained and does not require an outside pressure source.

It is a further object of the present invention to provide a leak detector which operates by producing a partial vacuum in a plastic bottle to be tested.

An additional object of the present invention is to provide apparatus for testing plastic bottles for leaks which is extremely simple and yet very reliable in operation.

Other objects and advantages of the present invention will become readily apparent from the following detailed description taken in conjunction with the annexed sheets of drawings on which:

FIG. 2 is a sectional elevational view taken through the detector unit and showing such unit immediately prior to its engagement with the bottle to be tested.

FIG. 3 is a view similar to FIG. 2 but showing the detector in engagement with the bottle to be tested.

Figure 1:
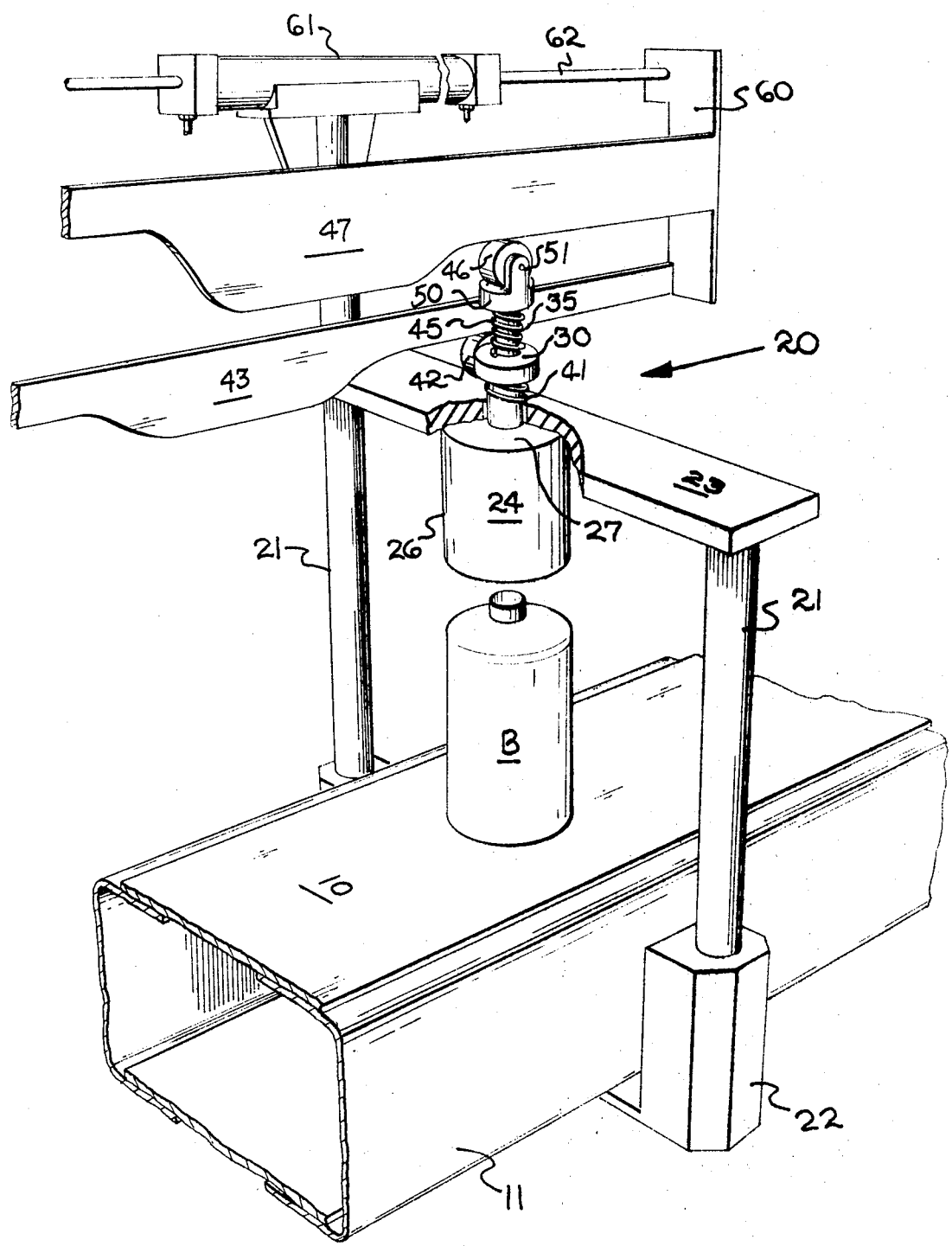
FIG. 1 is a perspective view illustrating the apparatus of the present invention.
Figure 5:
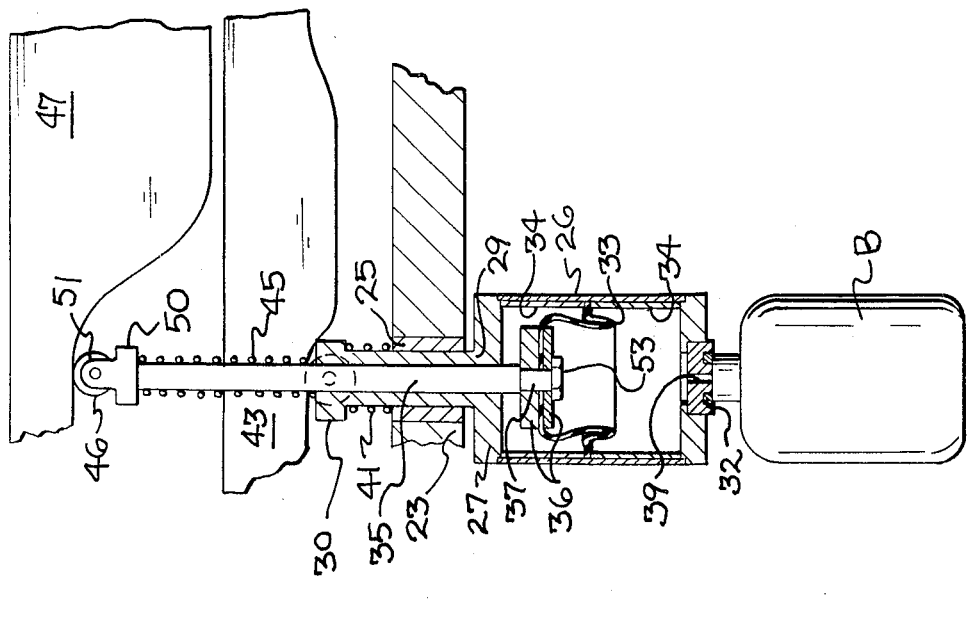
FIG. 5 is a view similar to FIG. 2 showing the next step in the operation in which the leak detector is moved upwardly to thereby lift, by means of the partial vacuum, the bottle being tested from its support.
Figure 4:
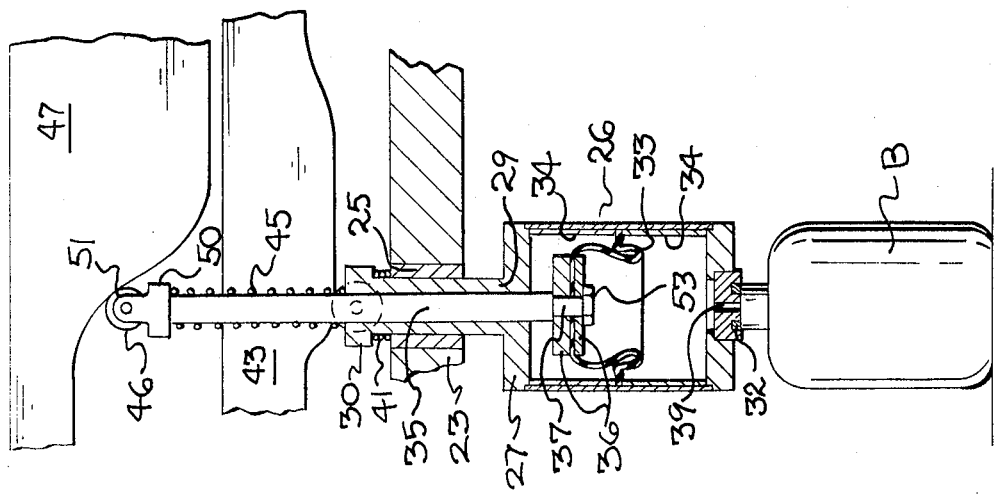
FIG. 4 is a view similar to FIG. 2 showing the leak detector and the bottle immediately upon creation of a vacuum within the bottle to be tested.

Referring now to the drawings, there is provided a conveyor having a belt 10 and any suitable support mechanism 11 for conveying bottles B to the testing station. Positioned above the conveyor 10 is a leak tester generally designated by the numeral 20 supported on guide rods 21 extending upwardly from a frame 22. Secured to the tops of the respective guide rods 21 is a stationary platform 23 having a detector head 24 supported thereon in slideable relationship thereto by means of a bushing 25. As illustrated, the detector head 24 includes a cylindrical sleeve 26, an upper end 27 and a lower end 28.

The upper end 27 has a collar 29 extending upwardly therefrom through the bushing 25. The collar terminates at its upper end in a radially enlarged flange 30. The flange 30 has a short pin (not shown) extending outwardly therefrom one which is mounted a cam roller 42. A compression spring 41 is interposed between the flange 30 and the bushing 25 and serves to urge the detector head 24 and the cam roller 42 upwardly. A cam 43 is positioned above the cam roller 42 and serves to limit the upward movement of such roller and the head 24. Thus, the cam 43 in cooperation with the cam roller 42 determines the vertical positioning of the detector head 24 and, as may be seen from FIGS. 2-5, coact to urge the head downwardly into engagement with the bottle B to be tested and then upwardly to lift such bottle off of the conveyor 10.

Extending from the lower end 28 is a plug gauge 31 which is sized to fit snugly within the neck of the bottle B to be tested. The plug gauge has a passageway 39 extending therethrough and communicating with the interior of the cylindrical sleeve 26. A resilient sealing pad 32 engages the top of the neck when the plug gauge 31 is inserted therein to seal the interior of the bottle B from atmosphere and to provide communication with the bottle and said sleeve interior.

Positioned within the cylindrical sleeve 26 is a flexible diaphragm 33, the outer edge of which is clamped between the ends of a pair of inner sleeves 34 telescoped within the cylindrical sleeve 26. The inner sleeves 34 are held in clamping relation against the diaphragm by the ends 27 and 28.

A rod is slideably received within the collar 29 and terminates at its upper end in a radially enlarged flange 50 from which a pair of legs 51 extend upwardly. The lower end of the rod 35 extends into the interior of cylindrical sleeve 26 and is interiorly threaded to receive a bolt 53 therein. A pair of circular plates 36 having apertures 37 through which the bolt passes are clamped between the end of the rod and the bolt. The central portion of the flexible diaphragm is clamped between plates 36 and hence is movable therewith upon axial movement of the rod 35.

A second compression spring 45 is interposed between the flange 30 of the collar 29 and the flange 50 of the rod 35 and serves to urge the rod 35 upwardly relative to the cylindrical sleeve 26. Mounted on top of the rod flange 50 is a second cam roller 46. A second cam 47 is mounted above the rod 35 for engagement by the second cam roller 46. Thus, the second cam 47 serves to determine the position of the rod 35 relative to the cylindrical sleeve 26 and, hence, to determine the position of the flexible diaphragm 32 relative to the plug gauge 31. The respective cams 43 and 47 are mounted on a frame 60, one end of which may be seen in FIG. 1. The frame 60 and hence the cams 43 and 47 may be moved relative to the detector head 24 and the respective cam rollers 42 and 46. Such movement is powered by means of a fluid pressure cylinder 61 having a piston rod 62 connected to the frame. Thus, it may be seen from reviewing the sequence of steps illustrated in the drawings that movement of the diaphragm upwardly or away from the plug gauge 31 when the plug gauge is in sealing engagement with the bottle to be tested will result in creating a condition within the sealed bottle of having the pressure therein slightly less than atmospheric. This condition results from the fact that after the bottle is sealed by the plug gauge the confined volume as contained within the bottle itself, the passageway 39 through the plug gauge, the lower end 28, the lower inner sleeve 34 and the flexible diaphragm, is increased when the flexible diaphragm is moved upwardly.

Referring now to FIGS. 2-5, a complete cycle of operations for testing a bottle will be described. Initially, the leak detector is in the position illustrated in FIG. 2. In that position, the detector haed 24 is raised out of engagement with the bottle B and the diaphragm 33 is in the lowered position toward the plug gauge 31.

When the bottle B to be tested is in position beneath the plug gauge, the cylinder 61 is actuated to extend the piston rod 62 and move the cams 43 and 47 to the right as viewed in the drawings. As can be seen from a comparison of FIGS. 2 and 3, such movement of the first cams 43 urges the detector head 24 downwardly causing the plug gauge 31 to enter the open neck of the bottle B and the sealing pad 32 to become sealingly engaged with the top of such neck. The simultaneous movement of the second cam 47 urges the second cam roller 46 controlling movement of the flexible diaphragm 33 downwardly a distance equal to the distance that the detector head is moved downwardly. As a result, the flexible diaphragm is in substantially the same position relative to the detector head 24 upon the initial engagement of the sealing head with the bottle B. Continued movement of the respective cams 43 and 47 brings them to the position illustrated in FIG. 4. Such movement permits the second cam roller 46 to move upwardly upon urging by the spring 45 thereby moving the diaphragm 33 upwardly and thereby creating a slight vacuum in the bottle B being tested. Immediately thereafter, upon continued movement of the respective cams to the position shown in FIG. 5, the first cam roller 42 becomes aligned with an upwardly sloping surface of the cam 43 thereby causing the detector head to be lifted under urging from the spring 41. The bottle B is lifted along with the detector head 24 as a result of the partial vacuum created therein. It will be readily appreciated that if a bottle is defective and permits atmospheric air to enter the sealed chamber, the bottle will no longer be retained on the detector head and will fall back to the conveyor 10 thereby indicating that such bottle is defective.

Assuming that the bottle is satisfactory, the bottle will be retained on the detector head until the mechanism returns the bottle to the conveyor. Such return of the bottle to the conveyor is accomplished simply by reversing movement of the piston rod and the cams 43 and 47.

It can be seen from the foregoing that the present invention provides an economical and compact unit for the testing of plastic bottles for leaks resulting from small holes therein. Furthermore, it has the advantage over prior art leak detectors in that there is no need for any pressure or manometer-type electric switches, no need for any valving of any sort with the result that the present unit is much more economical than any heretofore known. Additionally, the leak detector of the present invention can detect holes as small as 0.006 inches in diameter.

I claim:

1. Apparatus for leak testing an open mouthed container positioned on a support comprising (I) a testing head having
    a. an end member sealingly engageable with said container mouth;
    b. a hollow body portion secured to said end member;
    c. a resilient diaphragm cooperating with the body portion and the end member to define a chamber, said resilient diaphragm having an outer periphery sealingly secured in fixed relation to said body portion;
    d. aperture means in said end member providing communication between said chamber and the interior of the container when the end member is sealingly engaged with the container mouth,
    e. means for moving said diaphragm in a direction increasing the effective size of the chamber when the end member is sealingly engaged to the container mouth to create a partial vacuum in said container and (II) means imparting relative movement between said testing head and said support following creation of said partial vacuum to retain said container on the testing head solely by the partial vacuum.

2. Apparatus for leak testing an open mouthed container comprising (I) a testing head having
    a. an end member sealingly engageable with said container mouth,
    b. a hollow body portion secured to said end member,
    c. a resilient diaphragm cooperating with the body portion and the end member to define a chamber therein, said resilient diaphragm having an outer periphery sealingly secured in fixed relation within said body portion,
    d. aperture means in said end member providing communication between said chamber and the interior of the container when the end member is sealingly engaged with the container mouth,
    e. means for moving said diaphragm in a direction increasing the effective size of the chamber when the end member is sealingly engaged to the container mouth to create a partial vacuum in said container, and (II) means for moving said testing head and the partially vacuumized container to a position during which the container is retained on the testing head solely by the partial vacuum.

3. Apparatus for leak testing an open mouthed container comprising (I) a testing head having
    a. sealing means engageable with said open mouth container for sealing the interior therof from the atmosphere,
    b. hollow body means,
    c. a resilient diaphragm positioned within said hollow body and having an outer periphery sealingly secured in fixed relation to said body means to define a chamber which is variable in size in response to movement of said diaphragm,
    d. means for providing communication between said chamber and the interior of the container when the sealing means is sealingly engaged with the container mouth,
    e. means to move said diaphragm in a direction increasing the effective size of the chamber so as to create a partial vacuum in said container when the sealing means is sealingly engaged to the container mouth, and (II) means for detecting the loss of said partial vacuum in said container by moving the container while it is sealingly engaged to said testing head.

4. Apparatus for leak testing an open mouthed container comprising (I) a testing head having
   a. sealing means engageable with said container for sealing the interior thereof from the atmosphere,
   b. a body portion to which the sealing means is engaged, said body portion having a hollow chamber,
   c. a resilient diaphragm positioned within said chamber, said diaphragm having an outer periphery sealingly secured in fixed relation to said body portion, the sealing means, the body portion and the diaphragm cooperating with the container being tested to define an enclosure isolated from the atmosphere,
   d. means for moving said diaphragm in a direction increasing the effective size of said enclosure when said container is sealingly engaged to said sealing means to create a partial vacuum in said container and (II) means for moving said testing head and the partially vacuumized container to a position during which the container is retained on the testing head solely by the partial vacuum.

* * * * *